Dec. 11, 1934.   R. D. HICKOK   1,983,665
ELECTRICAL MEASURING INSTRUMENT
Filed Dec. 18, 1931

INVENTOR
Robert D. Hickok
BY
Brockett, Hyde, Higley & Meyer
ATTORNEYS

Patented Dec. 11, 1934

1,983,665

UNITED STATES PATENT OFFICE 1,983,665

ELECTRICAL MEASURING INSTRUMENT

Robert D. Hickok, Cleveland, Ohio, assignor to Cleveland Patents, Incorporated, Cleveland, Ohio, a corporation of Ohio Application December 18, 1931, Serial No. 581,886

6 Claims. (Cl. 175—183)

This invention relates to electrical measuring instruments, and particularly to an instrument designed for the accurate measurement of any one or more of resistance, capacity and voltage. Although capable of use for other purposes, it is particularly designed for the testing of condensers such as are used in radio receivers and for automobile ignition systems.

Referring particularly to condensers used in ignition systems, such condensers are usually connected in parallel with the primary make and break. At the moment of breaking the primary circuit connecting the coil to the battery a high voltage is applied across the contacts and is impressed across the condenser, charging the same to a high value, and the discharge of the condenser produces a high potential in the secondary, thus producing the spark for ignition purposes. If the condenser has low dielectric value or, in other words, if there is a leakage of current through it, it will not charge up to the required high potential and the resulting spark will be weak. It is therefore desirable to test the condenser from two standpoints, to wit, as to its resistance or dielectric value and also as to its capacity.

In testing such condensers, the application of low voltage is not satisfactory, because under low voltage the condenser may show an apparent high dielectric strength and nevertheless break down or show leakage when high voltage is applied to it, and the use of batteries to produce high voltage is impractical owing to their size and weight.

The present invention has for its object to provide an electrical measuring instrument by means of which a condenser or any other device may be tested for resistance under high voltage conditions simulating or approximating those which it is intended to encounter in use, and further, an instrument which may be applied to the condenser and by very simple manipulations may be used for the purpose of testing alternatively either its resistance or its capacity, with direct accurate readings of the values thereof.

A further object of the invention is to provide such an instrument in which one of its meters, such as the ohmmeter, is also capable of use as a voltmeter for the testing of potential in outside circuits, and is further provided with the necessary parts for adapting it to a plurality of different ranges of resistance or voltage variation.

Further objects of the invention are in part obvious and in part will appear more in detail hereinafter.

Figure 1:
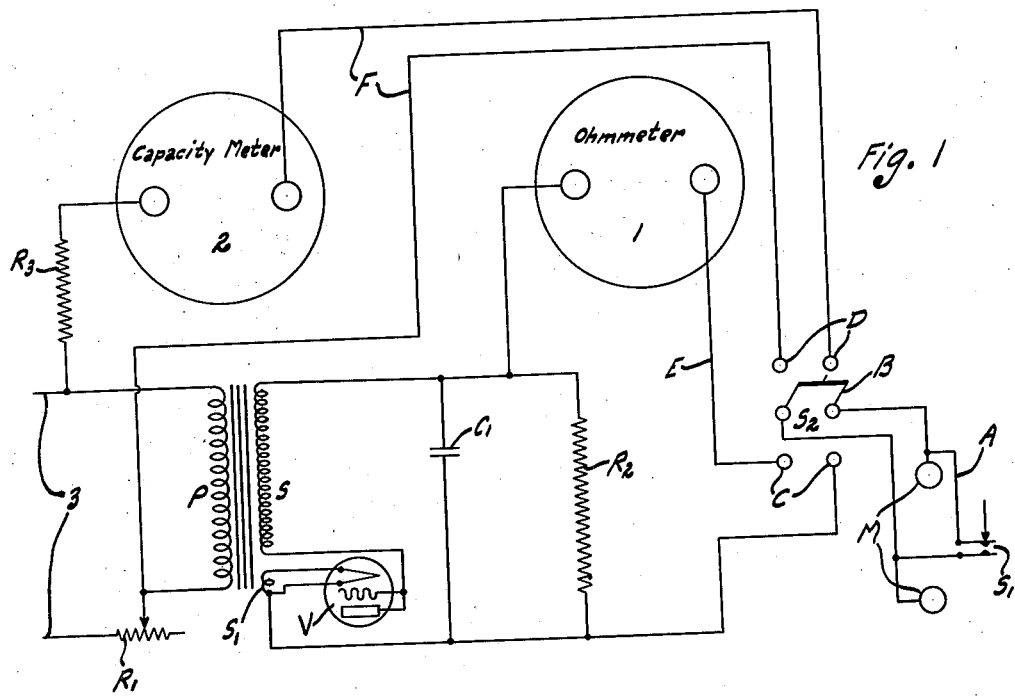
Figure 2:
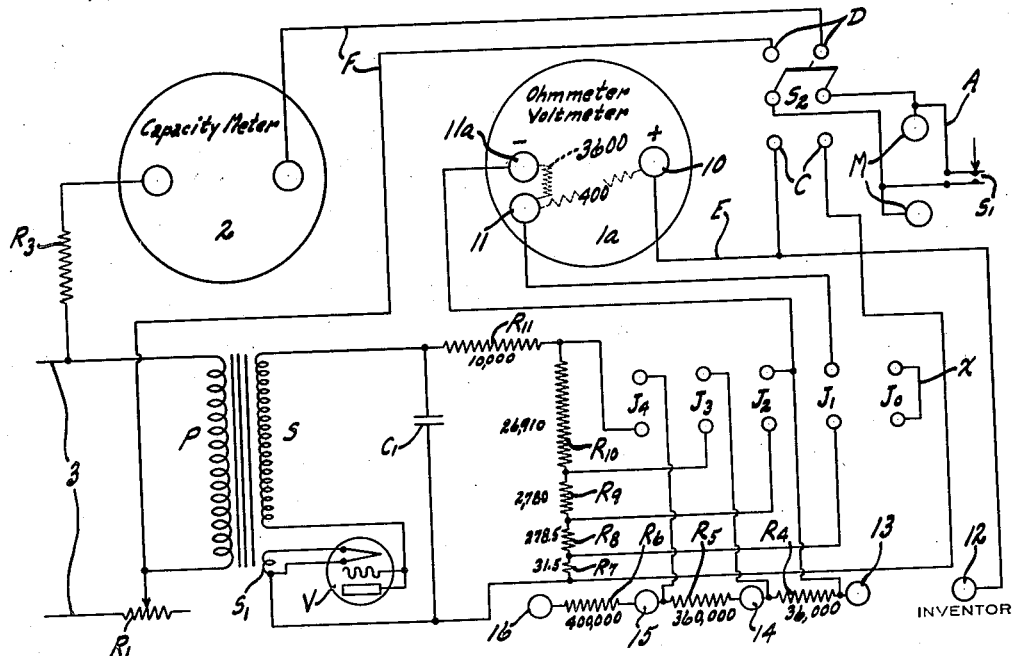

In the drawing, Fig. 1 represents a diagram of one simple form of apparatus embodying the invention and Fig. 2 is a similar diagram illustrating another arrangement which is also usable as a voltmeter.

Referring first to Fig. 1, which represents an instrument designed for the testing of condensers, but suitable for testing the resistance of any device, the instrument comprises an ohmmeter 1 and a capacity meter 2 connected in circuits for alternative use for the purpose of measuring either the resistance or the capacity of a condenser subjected to a desired potential as the result of current derived from a source external to the instrument. While the instrument may be arranged to apply any voltage to the condenser, the particular instrument shown in the drawing is adapted to apply 300 volts of direct current or 100 volts alternating current to the condenser, the power therefor being derived from an outside source, assumed to be a standard 110 volt 60 cycle alternating current source, the leads to which are indicated at 3. The instrument embodies a transformer, the primary P of which is adapted for connection to the leads 3 and has in series with it an adjustable regulating resistance $R_1$ of a value of say 250 ohms, and which is utilized for adjusting the applied potential for the purpose of insuring the application to the condenser or other device to be tested of a definite desired voltage maintained at the selected value. The transformer also includes two secondaries S and $S_1$, the latter of which is wound to produce the necessary voltage for a suitable rectifier V for producing the direct current which is applied to the condenser. The drawing shows the secondary $S_1$ arranged to produce 5 volts so that either a standard rectifying tube or any ordinary 5 volt tube may be employed, such as types 201—A, 112—A or the like, the two plates or the plate and the grid thereof being linked as shown to operate as one element. This arrangement simplifies the apparatus and adapts it to readily obtainable commercial tubes.

The secondary S is wound to produce approximately 300 volts potential and is in series with a resistance $R_2$ of suitable value, such as 30,000 ohms, and which serves to stabilize the voltage applied to the condenser. In parallel with said resistance is a fixed condenser $C_1$ with a value of about 1 mfd., which serves to produce very nearly pure direct current without alternating current ripple across the terminals of the load resistance $R_2$ for application to the condenser under test.

The instrument is also supplied with a pair of terminals, such as binding posts M, across which the condenser to be tested is bridged. This may be accomplished in any suitable manner, such as by direct connection of the condenser plates to the terminals M, or the latter may be provided with leads and prods (not shown) for application to the condenser. The gap across said terminals may be short circuited by a normally open circuit A including a normally open push button switch S₁, whose purpose will later appear.

Said terminals M are also connected to a switching device, marked generally S₂, of such form as to be capable of operation for selectively or alternately connecting the condenser under test either to the ohmmeter or to the capacity meter, for direct testing and reading of either its resistance or its capacity. This may be any type of switch, rotary, swinging or the like, but for convenience is illustrated as a conventional double pole double throw switch with the terminals M connected to its blades B, which operate between two pairs of contacts C, D, the former of which are in a circuit E in shunt around the continuous load resistance R₂ and including the ohmmeter 1.

The second pair of contacts D are in a circuit F in parallel with the primary P of the transformer and including the capacity meter 2 and a fixed resistance R₃ which is chosen of suitable value, say 3200 ohms, according to the maximum capacity to be read upon the capacity meter, and also according to the assumed alternating current voltage applied to the primary P, in the present case 100 volts, as well as the sensitivity of the capacity meter 2, which in effect is an alternating current milliammeter.

Obviously, by moving the blades of switch S₂ to either of the two positions, either the ohmmeter or the capacity meter may be connected to the condenser under test, so that without change of the position of the prods or the connection of the condenser to the instrument, either its resistance or its capacity may be readily determined by the proper position of the switch S₂.

When the switch S₂ is in its lower position connected to the resistance contacts C, the direct current voltage generated by the rectifier and condenser C₁ is applied directly through the ohmmeter to the condenser to be tested. The ohmmeter is made with a high resistance of approximately 600,000 ohms, which enables values as high as 100 megohms to be read directly. The instrument therefore is essentially a so-called megger in its possibility of accurately measuring high resistance.

The short circuiting switch S₁ is used as a test switch and for the purpose of calibrating the instrument, or in other words, of adjusting the applied voltage so as to insure the application of exactly 300 volts to the device under test and consequently of causing the pointer of the ohmmeter to travel to full scale position under no load to be tested. In other words, assuming the terminals M connected to a condenser to be tested and the instrument to be connected to the alternating current source, as shown, the test switch S₁ is closed and variable resistance R₁ is adjusted until the pointer of the ohmmeter registers accurately at the full scale position. This adjustment insures that exactly 300 volts will be applied to the condenser under test. The test switch S₁ is then released and opens and the pointer of the ohmmeter will move to a position indicating accurately the resistance of the condenser under test with a voltage of 300 volts applied to it.

The ohmmeter of course is actually a voltmeter calibrated in terms of resistance for use under the circumstances described.

The capacity meter 2 is actually an alternating current milliammeter and while it may be so built as to cover any desired range of capacity, in the present instrument it has been designed to cover a range of capacities from .05 mfd. to 5 mfd., the latter value, together with sensitivity and the applied voltage of 100 volts, determining the value of 3200 ohms for resistance R₃. In use of this device the test switch S₁ is also employed. In other words, when capacity is to be read, the switch S₂ is thrown to its upper position on capacity contacts D and then test switch S₁ is closed, whereupon the variable resistance R₁ is adjusted until the pointer of the capacity meter registers accurately at the full scale position, insuring that 100 volts alternating current will be applied to the condenser under test. The switch S₁ is then released and opens, applying the full alternating current voltage to the condenser under test and the capacity meter directly indicates the condenser capacity.

This capacity meter is built and operates according to the well known formula based upon the fact that if the voltage and frequency in an alternating current circuit are constant, the actual capacity of a condenser in that circuit may be measured by a suitable alternating current milliammeter calibrated directly in microfarads. This equation is as follows:

$$C = \frac{I}{2\pi n\sqrt{E^2 - I^2 R^2}}$$

in which

C = capacity
I = current
E = voltage
N = frequency
R = resistance

Fig. 2 shows a similar instrument designed for a wider range of use and also embodying the necessary means enabling it to be used as a voltmeter. The capacity meter 2 is arranged and operates as in Fig. 1.

The meter 1a has a single positive post 10 and two negative posts 11, 11a and the resistances across the two pairs are proportioned so that when posts 10, 11 are in circuit 400 ohms are in series and the range is from 0 to .3 volts. When posts 10, 11a are in use an extra 3,600 ohms is in series, with a total of 4,000 ohms, and the range is from 0 to 3 volts. Post 10 is connected to a terminal 12 and post 11a to a terminal 13, the latter being connected through resistance R₄ of 36,000 ohms to tap terminal 14, thence through resistance R₅ of 360,000 ohms to terminal 15 and thence through resistance R₆ of 400,000 ohms to terminal 16.

With all switches open the meter 1a may be used as a voltmeter by connecting one lead to terminal 12 and the other to a terminal 13, 14, 15 or 16, with consequent ranges of 3 volts, 30 volts, 300 volts or 600 volts. The pairs of terminals, of course, will be connected by leads and prods or the like to any two points in a live circuit across which a voltage drop is to be measured, and the meter scale will be graduated with four different sets of values or indications for its several ranges.

This arrangement has also been modified or supplemented in regard to use of meter 1a as an ohmmeter. The secondary $S_{10}$ is wound to produce 400 volts. The load resistance, marked $R_2$ in Fig. 1, is here tapped into several sections $R_7$, $R_8$, etc., with a total value of 40,000 ohms and with separate values as indicated. The several sections are connected to a series of pairs of jacks $J_0$, $J_1$, $J_2$, $J_3$, $J_4$, connected to the meter $1a$ and to the several resistances $R_4$, $R_5$ and $R_6$, as shown.

With this arrangement I use a detachable bridge X normally held in the blank jacks $J_0$ and insertable into any pair of jacks $J_1$, $J_2$, or the like. In jacks $J_1$ .3 volt across resistance $R_7$ is applied to the device to be tested and the ohmmeter reads from 5 to 30,000 ohms. In jacks $J_2$ the voltage is 3 and the resistance range from 50 to 300,000 ohms. In jacks $J_3$ the voltage is 30 and the resistance range from 500 ohms to 3 megohms, while in jacks $J_4$ the voltage is 300 and the resistance range is from 5,000 ohms to 30 megohms, and the meter scale is calibrated accordingly. Switches $S_1$ and $S_2$ and resistance $R_1$ operate as before.

What I claim is:

1. A combined instrument for testing condensers, comprising an ohmmeter, a capacity meter, circuits adapted for connection to an alternating current source and provided with means for applying an alternating current potential to said capacity meter and a direct current potential to said ohmmeter, means for connecting a condenser to be tested alternatively to either of said meters, and switch means for short circuiting said condenser when connected to either of said meters.

2. An instrument of the class described, comprising terminals adapted for connection to a condenser to be tested, an ohmmeter, a source of direct current potential therefor, a capacity meter, a source of alternating current potential therefor, switch means adapted to selectively connect said condenser terminals to either said ohmmeter and its source of potential or to said capacity meter and its source of potential, and means for short-circuiting the condenser terminals.

3. An instrument of the character described in claim 2, including means for adjusting the potential applied to said ohmmeter.

4. An instrument of the character described in claim 2, including means for adjusting the potential applied to said capacity meter.

5. An instrument of the class described, comprising a transformer, including a primary adapted for connection to an alternating current source and provided with means for regulating the applied voltage, the secondary thereof being in a circuit including a rectifier, a condenser and a resistance in parallel relation, whereby definite direct current potential may be applied to said resistance, a circuit in parallel with said resistance and including a meter and means for connecting the same to a device to be tested, means for short circuiting said device to be tested, and means for adjusting the direct current potential applied thereto.

6. An instrument of the class described, comprising a resistance, means for applying a direct current potential thereto, a meter in a circuit in parallel with said resistance, means in said circuit adapted for connection to a device to be tested for determining the resistance thereof, said meter having two posts one of which is provided with tapped external resistance, and separate terminals for connection of said meter in series through selected amounts of said tapped resistance to a device whose voltage is to be tested.

ROBERT D. HICKOK.